(12) United States Patent
Carlson

(10) Patent No.: US 9,253,938 B2
(45) Date of Patent: Feb. 9, 2016

(54) LEVELING AND TILLAGE IMPLEMENT

(71) Applicant: Keith Carlson, Gothenburg, NE (US)

(72) Inventor: Keith Carlson, Gothenburg, NE (US)

(*) Notice: Subject to any disclaimer, the term of this patent is extended or adjusted under 35 U.S.C. 154(b) by 0 days.

(21) Appl. No.: 14/517,440

(22) Filed: Oct. 17, 2014

(65) Prior Publication Data
US 2015/0107864 A1 Apr. 23, 2015

Related U.S. Application Data

(60) Provisional application No. 61/892,610, filed on Oct. 18, 2013.

(51) Int. Cl.
A01B 49/02 (2006.01)
A01B 63/10 (2006.01)
A01B 63/32 (2006.01)
A01B 63/00 (2006.01)
A01B 5/04 (2006.01)
A01B 29/04 (2006.01)
A01B 39/04 (2006.01)

(52) U.S. Cl.
CPC . *A01B 63/32* (2013.01); *A01B 5/04* (2013.01); *A01B 29/048* (2013.01); *A01B 39/04* (2013.01); *A01B 49/027* (2013.01); *A01B 63/004* (2013.01); *A01B 63/008* (2013.01)

(58) Field of Classification Search
USPC .......... 172/140, 145, 149, 151, 177–180, 184
IPC ........... A01B 5/04,39/04, 39/08, 49/02, 49/027, A01B 63/10, 63/32
See application file for complete search history.

(56) References Cited

U.S. PATENT DOCUMENTS

| 4,245,706 | A  | * | 1/1981  | Dietrich, Sr. ................ 172/180 |
| 4,479,549 | A  | * | 10/1984 | Fegley ........................ 172/142 |
| 7,000,708 | B2 | * | 2/2006  | Powell et al. ................ 172/600 |
| 7,017,675 | B2 | * | 3/2006  | Ankenman et al. .......... 172/146 |
| 7,048,069 | B1 | * | 5/2006  | Bollich ........................ 172/187 |
| 7,108,075 | B2 | * | 9/2006  | Powell et al. .................... 172/1 |
| 8,047,299 | B2 | * | 11/2011 | Hurtis et al. ................. 172/146 |
| 8,714,276 | B2 | * | 5/2014  | Hake et al. .................... 172/176 |

* cited by examiner

Primary Examiner — Gary Hartmann
(74) Attorney, Agent, or Firm — David H. Milligan

(57) ABSTRACT

A leveling and tillage implement for attachment to another vehicle for tilling and leveling a ground surface. The implement utilizes a row of hydraulically controlled discs to provide an angular adjustment of the discs to achieve effective tilling of the soil. Further, the implement includes a box scraper that can be raised up and lowered down to pull dirt forward to fill holes, level off high spots or build a mound.

11 Claims, 4 Drawing Sheets

LEVELING AND TILLAGE IMPLEMENT

RELATED APPLICATIONS

The present application claims priority to U.S. Provisional Application No. 61/892,610 filed Oct. 18, 2013.

FIELD OF INVENTION

The present invention is related in general to agricultural implements and, in particular, to a leveling and tillage implement that is connected with a farm tractor for tilling and leveling a ground surface.

BACKGROUND OF THE INVENTION

Tillage is an operation applied prior to sowing to improve soil conditions for optimal crop emergence and yield. Various types of implements are currently employed to loosen, invert, and mix the soil, modify the surface configuration, change aggregate size, incorporate materials (fertilizers, manure, crop residues, etc.), eradicate weeds, and form openings for seed placement according to the soil properties. Tillage implements provide mechanical manipulation of soil to achieve a desired seedbed and to provide an optimum environment for seed germination and plant growth. The tillage implements include self-propelled and heavy equipment such as crawler tractors with heavy duty plows and dozers, high horsepower tractors with dozing and hoeing attachments, harrows, discs, scrapers, ditchers, chisel plows, subsoilers, terracers and levelers etc.

Certain tillage implements form a compacted layer at the base of the plow and cause the blockage of soil pores which hinder drainage. Additionally, these and other implements have been shown to inhibit soil biological activity due to the high degree of soil disturbance and lack of residues on the soil surface. Negating these effects requires time consuming efforts to achieve effective tilling of the soil.

Some tillage implements provide tilling/plowing of the soil to provide a seedbed for sowing/planting of different crops. However, even though these implements provide tilling, they do not include an effective leveling system to move/drag earth for improving drainage and to provide improved erosion control.

Most of the conventional tillage implements require numerous pieces of equipment which result in high operational and maintenance costs. Moreover, they cause excessive soil compaction and water loss from the soil. In addition, the conventional tillage implements are relatively inefficient and consume large amounts of fuel.

Conventional tillage implements known in the art generally include rotary discs with adjustable angles to till the soil and a scraper/bucket to move/scrap the soil. However, the downside to these implements is that they lack the ability to remove deep ruts created by the wheels of other field equipment (i.e. a center pivot irrigation system).

Based on the foregoing, there is a need for a pull type leveling and tillage implement which utilizes a rolling attachment to move/drag/level earth for improving drainage and erosion control.

SUMMARY OF THE DISCLOSURE

To minimize the limitations found in the prior art and other limitations that will be apparent upon the reading of the specification, the preferred embodiment of the present invention provides a leveling and tillage implement which fills deep ruts in plowed or tilled soil which may be created by any of a variety of field equipment.

The present invention discloses a leveling and tillage implement which is designed to be removably attached to a vehicle for tilling and leveling a ground surface. The implement includes a main frame assembly that is capable of being pulled in a given direction of travel. The main frame assembly includes a main frame extending generally transverse to the direction of the travel of the main frame assembly. The main frame includes a pair of opposing side frame members, a front frame member having a first end and a second end, preferably the first and second ends include a locking bracket, a pair of first and second lower frame members, a crank shaft coupled with the pair of first and second lower frame members utilizing a linking member through the locking brackets of the first and second ends of the front frame member respectively, a cross frame member having a first end and a second end which includes a locking bracket and a rear frame member.

Furthermore, the main frame assembly of the present invention may include an upper frame member being longitudinally disposed between the pair of opposing side frame members and attached on the locking brackets of the first and second ends of the cross frame member utilizing a clamp member. The upper frame member may include a first end and a second end. Preferably the first and second ends of the upper frame member are attached to a first elongated arm bracket and a second elongated arm bracket respectively.

Additionally, the main frame assembly may include a pair of opposing wheels, each wheel being positioned substantially centerline of the main frame along the direction of travel and pivotally mounted to one end of the first and second elongated arm brackets respectively.

Also, the main frame assembly preferably includes a pair of disc assemblies, each disc assembly being positioned along the front frame member at the first and second lower frame members respectively and in front of the pair of opposing wheels. Each disc assembly preferably has a plurality of disc gangs mounted along a shaft for plowing or tilling the ground surface. The plurality of disc gangs preferably include front disc gangs, left disc gangs and right disc gangs. The front disc gangs are arranged symmetrically about a centerline of the implement and perpendicular to the direction of travel. The left and right disc gangs are preferably linked along the shaft to move in time with each other when adjusting an angle of the plurality of disc gangs relative to the main frame. The front disc gangs are preferably configured to move dirt on the ground surface to the center to fill pivot tracks, wash-outs, ruts and trenches. The left disc gangs may be locked straight to move the dirt to the center from the right disc gangs. Ideally, the plurality of disc gangs can be hydraulically swiveled to move more or less dirt.

Still further, the main frame assembly preferably includes a box scraper attached with the cross frame member and a rolling attachment connected at the rear frame member. The rolling attachment is preferably positioned to level a plowed/tilled ground surface. Additionally, the main frame assembly preferably includes a connecting element which is adapted to be removably attached to a vehicle.

In operation, the main frame assembly includes a first actuator assembly operably connected along the front frame member and the upper frame member for pivotally raising and lowering the pair of disc assemblies, a second actuator assembly operably coupled between the pair of first and second lower frame members and the locking brackets of the first and second ends of the cross frame member for hydraulically controlling the pair of disc assemblies to provide an angular adjustment of the plurality of disc gangs and a third actuator assembly operably connected to the rear frame member for hydraulically raising and lowering the rolling attachment and the box scraper with respect to the ground surface.

In another exemplary embodiment of the present invention, the implement includes a center frame section instead of a crank shaft and a third actuator assembly for transmitting motion to the pair of disc assemblies, box scraper and rolling attachment. The center frame section includes a hydraulic actuator for controlling the traction of the pair of disc assemblies and the rear frame member preferably includes a hydraulic actuator for controlling the traction of the box scraper and the rolling attachment.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and to improve the understanding of the various elements and embodiments of the invention. Furthermore, elements that are known to be common and well understood to those in the industry are not depicted in order to provide a clear view of the various embodiments of the invention. Thus, it should be understood that the drawings are generalized in form in the interest of clarity and conciseness.

DETAILED DESCRIPTION OF THE DRAWINGS

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
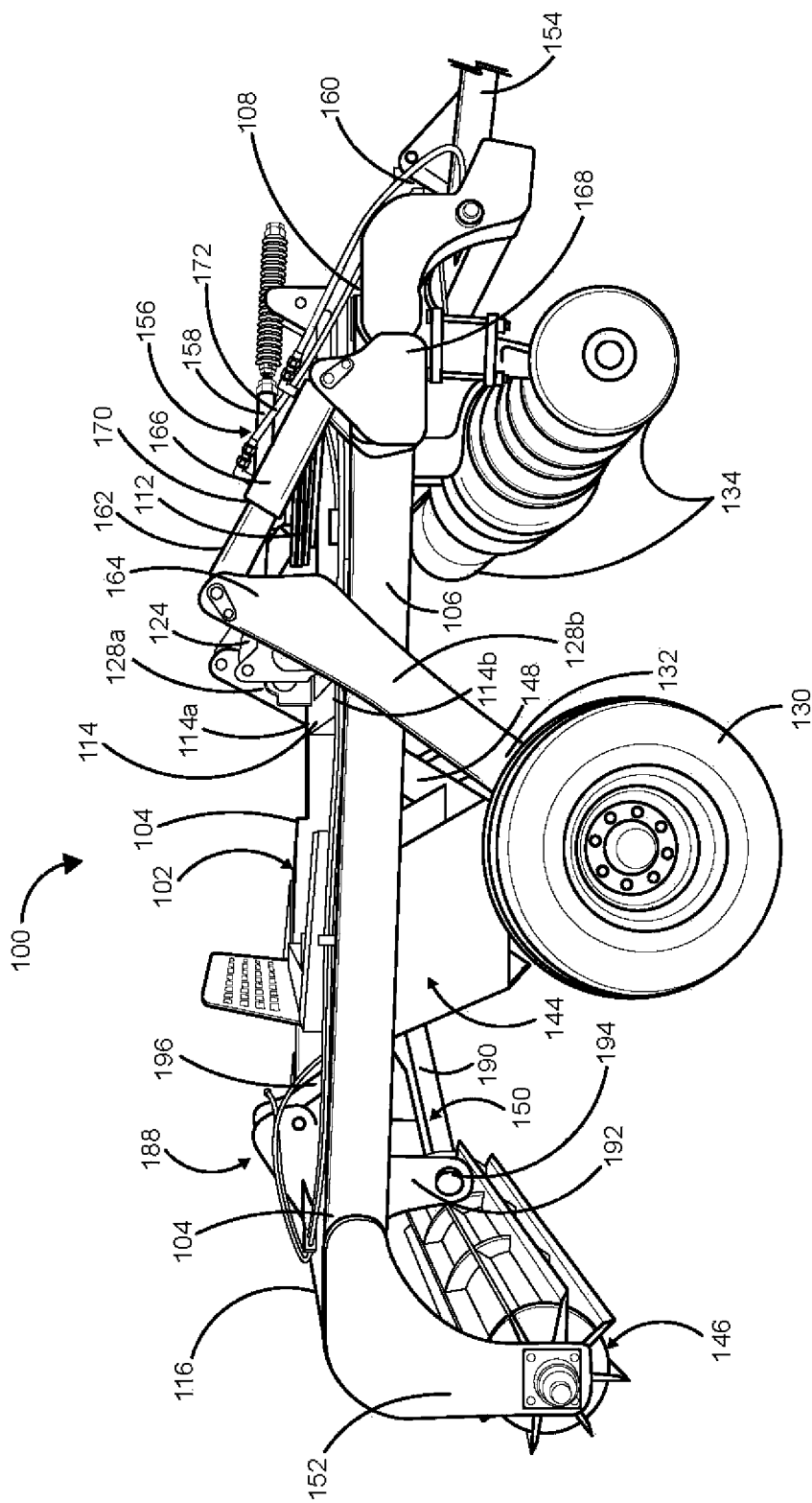
FIG. 1 is a side perspective view of a preferred embodiment of a leveling and tillage implement of the present invention.
Figure 2:
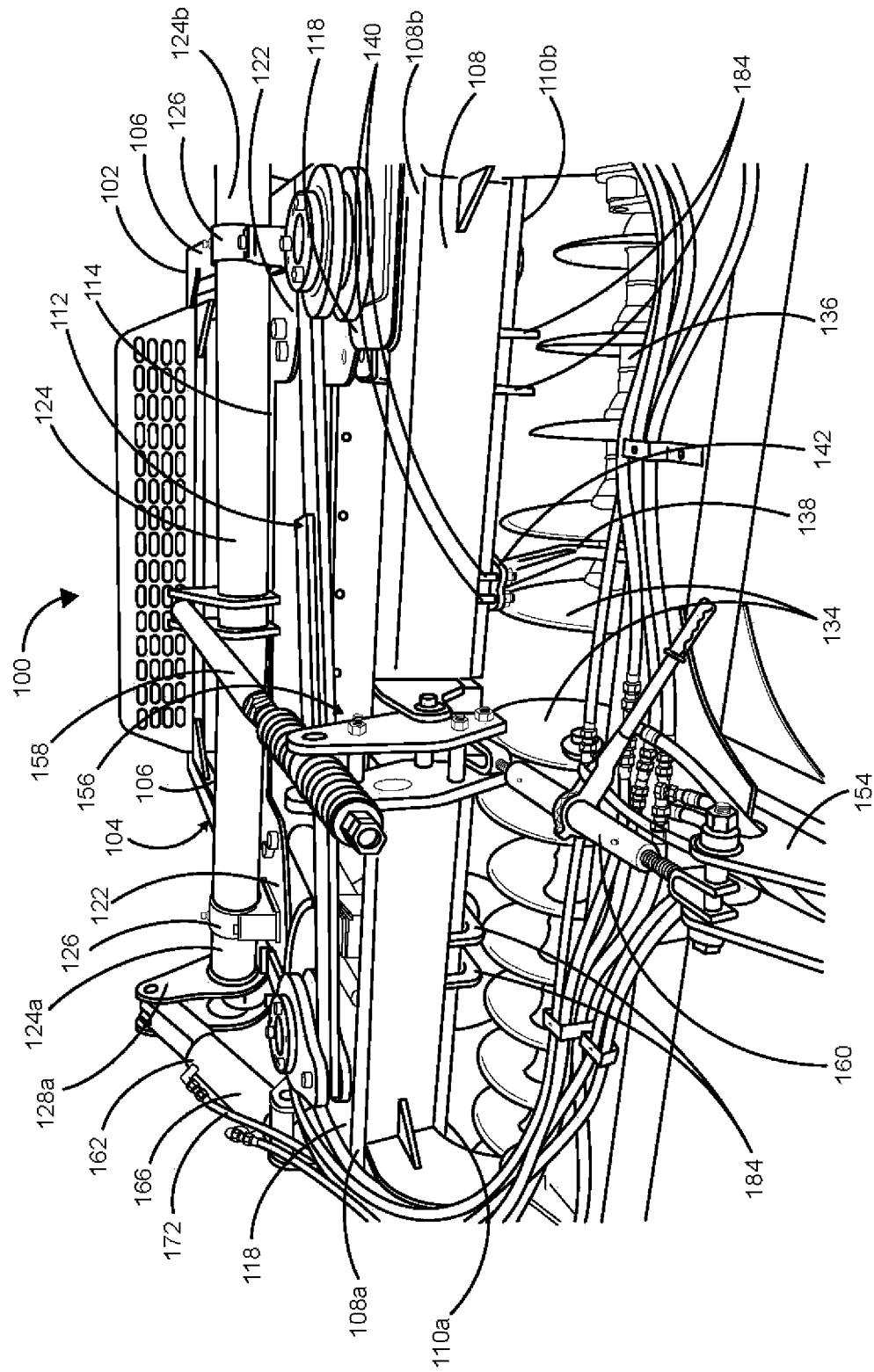
FIG. 2 is a front perspective view of the leveling and tillage implement, illustrating a plurality of disc assemblies located along a front frame member of a main frame of the present invention.

FIGS. 1 and 2 are side and front perspective views, respectively, of a preferred embodiment of a leveling and tillage implement 100 of the present invention. The leveling and tillage implement 100 is preferably a pull type unit which is configured to be removably attached to a vehicle for tilling and leveling a ground surface. As shown, the implement 100 preferably includes a main frame assembly 102 that is capable of being pulled by a vehicle in a direction of travel. The main frame assembly 102 preferably includes a main frame 104 extending generally transverse to the direction of the travel of the main frame assembly 102. The main frame 104 includes a pair of opposing side frame members 106, a front frame member 108, a pair of first and second lower frame members 110a, 110b, a crank shaft 112, a cross frame member 114 and a rear frame member 116. The front frame member 108 preferably has a first end 108a and a second end 108b and, preferably, both the first and second ends 108a, 108b include a locking bracket 118. As further shown, the crank shaft 112 is preferably coupled with the pair of first and second lower frame members 110a, 110b utilizing a linking member 120 through the locking bracket 118 of the first and second ends 108a, 108b of the front frame member 108 (See FIG. 3). The cross frame member 114 preferably has a first end 114a and a second end 114b and, preferably, both the first and second ends 114a, 114b include a locking bracket 122.

As further shown, the main frame assembly 102 preferably further includes an upper frame member 124 longitudinally disposed between the pair of opposing side frame members 106 and attached on the locking bracket 122 of the first and second ends 114a, 114b of the cross frame member 114 utilizing a clamp member 126. The upper frame member 124 preferably further includes a first end 124a and a second end 124b and, preferably, the first end 124a and the second end 124b may be attached to a first elongated arm bracket 128a and a second elongated arm bracket 128b.

The main frame assembly 102 further preferably includes a pair of opposing wheels 130. According to a preferred embodiment, each wheel 130 is preferably positioned substantially centerline of the main frame 104 along the direction of travel and pivotally mounted to one end 132 of the first and second elongated arm brackets 128a, 128b respectively. The main frame assembly 102 preferably further includes a pair of disc assemblies 134, each positioned along the front frame member 108 at the pair of first and second lower frame members 110a, 110b respectively and in front of the pair of opposing wheels 130. Each pair of disc assemblies 134 preferably includes a plurality of disc gangs mounted along a shaft 136 with the plurality of disc gangs positioned to plow/till the ground surface. As shown, the pair of disc assemblies 134 are preferably pivotally connected to the pair of first and second end lower frame members 110a, 110b by hanger 138 and fixed at one end to the shaft 136 and pinned at its other end by pins 140 received by connecting lugs 142 fixed to the pair of first and second end lower frame members 110a, 110b (See FIG. 2.)

As shown in FIG. 2, the plurality of disc gangs are preferably arranged in a V-shaped configuration with its apex pointing in the direction of travel during tilling. The plurality of disc gangs include front disc gangs, left disc gangs and right disc gangs. In the configuration shown in FIG. 1, the front disc gangs are symmetric about a centerline of the implement and perpendicular to the direction of travel. The left and right disc gangs are linked along the shaft 136 to move in time with each other when adjusting an angle of the plurality of disc gangs relative to the main frame 104. The front disc gangs move dirt on the ground surface to the center to fill pivot tracks, washouts, ruts and trenches. The left disc gangs can be locked straight to move the dirt to the center from the right disc gangs. The plurality of disc gangs can be hydraulically swiveled to move more or less dirt. The pair of opposing wheels 130 are preferably adjusted to reduce the motion of the main frame 104 perpendicular to the direction of travel caused by the plurality of disc assemblies 134 rotatably engaging the ground surface.

The main frame assembly 102 preferably further includes a box scraper 144 and a rolling attachment 146 which are positioned to level a plowed/tilled ground surface. The box scraper 144 is preferably attached with the cross frame member 114 utilizing a support frame member 148 and also attached with the rear frame member 116 utilizing an actuating mechanism 150. The rolling attachment 146 is connected at the rear frame member 116 along the pair of opposing side frame members 106 and behind the pair of opposing wheels 130 utilizing an arm member 152.

As further shown, the front frame member 108 is attached with a connecting element 154 that is adapted to removably attached to a vehicle. The connecting element 154 may preferably be a vertically pivoting single point hitch, although any alternative connecting mechanism may also be used.

Figure 3:
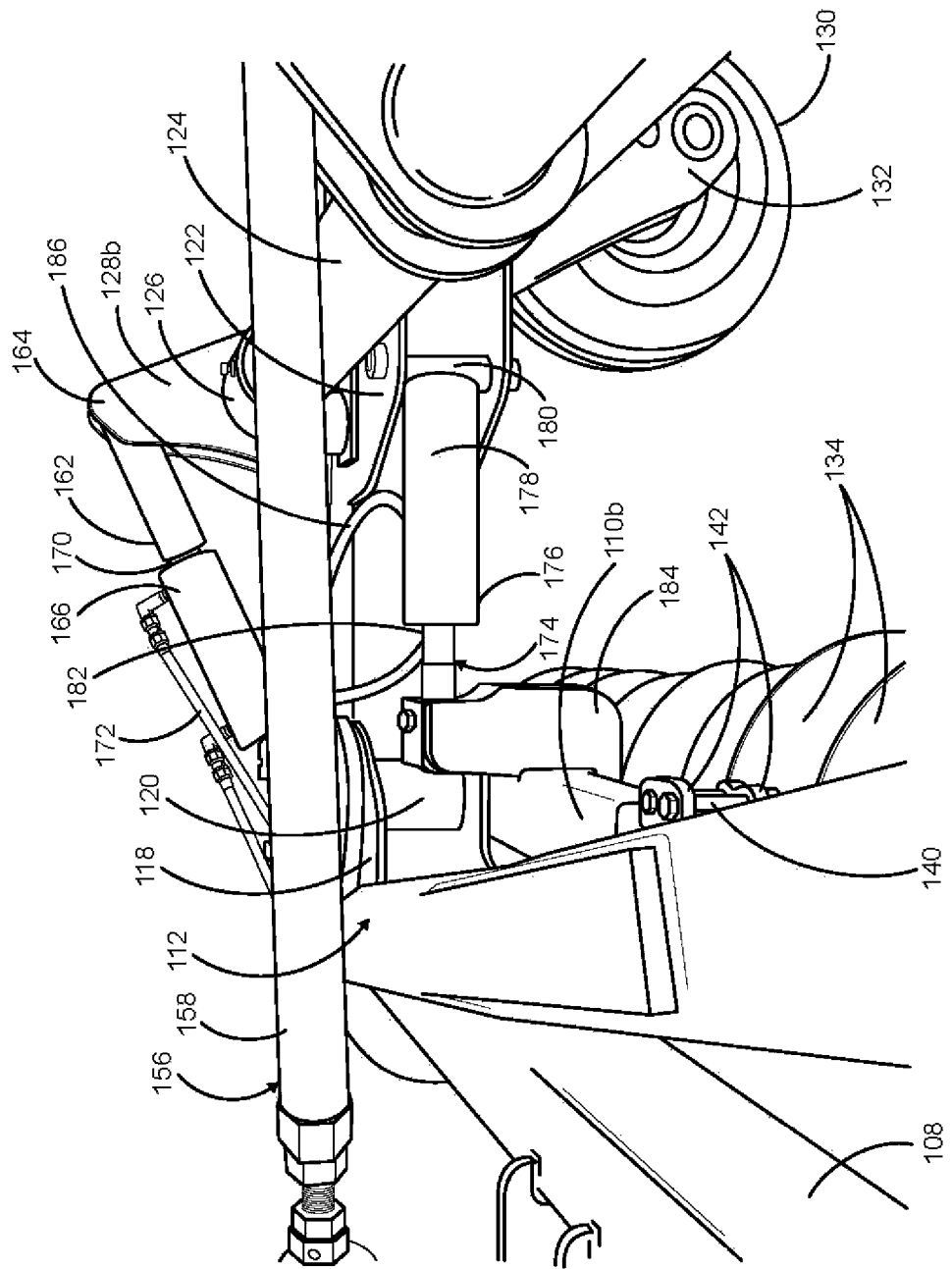
FIG. 3 is an enlarged view of the front frame member of the main frame of the leveling and tillage implement shown in FIG. 2.

With further reference now to FIGS. 1 and 2, the main frame assembly 102 may preferably further include a first actuator assembly 156 having a first actuating rod 158 attached between the front frame member 108 and the upper frame member 124, a second actuating rod 160 attached between the connecting element 154 and the front frame member 108 and a hydraulic actuator 162 attached between an end 164 of the first and second elongated arm brackets 128a, 128b and the pair of side frame members 106. The first actuator assembly 156 may be operably connected along the front frame member 108 and the upper frame member 124 for pivotally raising and lowering the pair of disc assemblies 134 as illustrated in the enlarged view of the front frame member 108 shown in FIG. 3. The hydraulic actuator 162 preferably includes a hydraulic cylinder 166 attached at a connecting member 168 which is attached along the pair of side frame members 106. The hydraulic cylinder 166 is preferably provided with a piston secured to a piston rod 170 which is connected to the upper ends 164 of the first and second elongated arm brackets 128a, 128b (the far upper end of arm bracket 128a is not shown). According to a further aspect of the present invention, the first and second elongated arm brackets 128a, 128b may be coupled to a hydraulic cylinder 166 by a suitable linkage that adjusts the first and second elongated arm brackets 128a, 128b upon cylinder extension and retraction. According to a preferred embodiment, although only one hydraulic cylinder 166 is shown in FIGS. 1-3, it should be understood that hydraulic cylinders may be attached to each of the first and second elongated arm brackets 128a, 128b respectively. For each, the hydraulic cylinder 166 retracts the piston rod 170 into the hydraulic cylinder 166 or extends it therefrom in response to hydraulic fluid flow to the hydraulic cylinder 166.

In operation, the second actuating rod 160 actuated by flow of hydraulic fluid in turn actuates the first actuating rod 158 which in turn actuates the upper frame member 124 (See FIG. 2). Thus, the pair of disc assemblies 134 may be pivotally raised and lowered with respect to the main frame 104, thereby changing the working depth of the pair of disc assemblies 134. Simultaneously, the hydraulic fluid supplied through a hose element 172 is discharged into the hydraulic cylinder 166 to act on the piston rod 170 and move it inwardly. Further, the first and second elongated arm brackets 128a, 128b may be moved by the piston rod 170 thus causing the pair of disc assemblies 134 to move upwardly towards the main frame 104. Conversely, when the hose element 172 supplies the hydraulic fluid to the opposite end of the hydraulic cylinder 166 so as to extend the piston rod 170 therefrom, the first and second elongated arm brackets 128a, 128b are moved by the piston rod 170, so that the pair of disc assemblies 134 is moved downwardly away from the main frame 104. This lowers the main frame 104 and in turn provides the tilling of the ground surface over which the implement 100 is being moved.

As shown in FIG. 3, the main frame assembly 102 preferably includes a second actuator assembly 174 having a hydraulic actuator 176. The hydraulic actuator 176 includes a hydraulic cylinder 178 attached at an attachment member 180 which is attached inside the locking brackets 122 of the first and second ends 114a, 114b of the cross frame member 114. The hydraulic cylinder 178 secured to a piston rod 182 is connected to an attachment element 184 which is connected with the pair of first and second lower frame members 110a, 110b. Thus, the first lower frame member 110a is coupled with the locking bracket 122 of the first end 114a of the cross member 114 and the second lower frame member 110b is coupled with the locking bracket 122 of the second end 114b of the cross frame member 114.

In operation, the piston either retracts the piston rod 182 into a hydraulic cylinder 178 or extends it therefrom in response to hydraulic fluid flow to the hydraulic cylinder 178. The hydraulic fluid supplied through a hose element 186 is discharged into the hydraulic cylinder 178 and moves the piston rod 182 inwardly. In response, the crank shaft 112 is rotated on the linking member 120, thus causing the pair of disc assemblies 134 to keep straight along the direction of travel. Conversely, when the hose element 186 supplies fluid to the opposite end of the hydraulic cylinder 178 so as to extend the piston rod 182 therefrom, the crank shaft 112 is rotated on the linking member 120, thus causing the pair of disc assemblies 134 to provide a V-configuration. The angular adjustment of the disc gangs is accomplished by the second actuation assembly 174 which is in working relationship with the crank shaft 112. The front, left and right disc gangs are angularly adjustable relative to one another and to the direction of travel of the at least one vehicle and implement 100. The second actuator assembly 174 is operably coupled between the pair of first and second lower frame members 110a, 110b and the locking brackets 122 of the first and second ends 114a, 114b of the cross frame member 114 respectively for hydraulically controlling the pair of disc assembly 134 to provide an angular adjustment of the plurality of disc gangs.

Still referring to FIG. 1, the main assembly 102 includes a third actuator assembly 188 that is operably connected to the rear frame member 116 of the main frame 104 for hydraulically raising and lowering the box scraper 144 and the rolling attachment 146 with respect to the ground surface. The box scraper 144 is attached with the cross member 114 utilizing the support frame member 148 and also attached with the rear frame member 116 utilizing the actuating mechanism 150. The actuating mechanism 150 includes a crank arm 190 connected with the box scraper 144 and a rocker arm 192 attached with the rear frame member 116. The crank arm 190 and the rocker arm 192 are connected to each other by way of at least one fastening element 194.

The third actuator assembly 188 includes a hydraulic actuator 196 that is connected to the rocker arm 192 and hydraulically controls the actuation of the box scraper 144 and the rolling attachment 146. When the box scraper 144 is lowered to the ground surface to pull dirt forward to center to fill holes, level off high spots or build a mound, the rolling attachment 146 is raised from the ground surface. Similarly, when the box scraper 144 is raised from the ground surface, the rolling attachment 146 is lowered to level and pack the dirt that has been moved to the center by the plurality of disc gangs and the box scraper 144. The box scraper 144 and the rolling attachment 146 keep proper machine level during leveling the ground surface.

In the preferred embodiment, the depth of ruts in the ground surface is controlled by raising and lowering the pair of disc assemblies 134. The depth of penetration of the disc assemblies 134 into the ground surface is further controlled by actuation of the first actuator assembly 156 which acts to pivotally raise and lower the disc assemblies 134 with respect to the main frame 104. Depending on the percentage of crop residue and soil conditions of the ground surface, the angular orientation of the disc assemblies 134 can be changed from a position in-line with the direction of travel to angle offset from the direction of travel. Preferably, this adjustment may be made on-the-go by actuation of the second actuator assembly 174. The adjustment of the angle of the disc assemblies 134 enables the farmer to vary the amount of crop residue left on the ground surface of soil as field conditions and crop residue requirements change. Further, the deep ruts formed or created by the pair of opposing wheels 130 and the pair of disc assemblies 134 can be filled and leveled by the box scraper 144 and the rolling attachment 146 which is controlled by the third actuator assembly 188.

Figure 4:
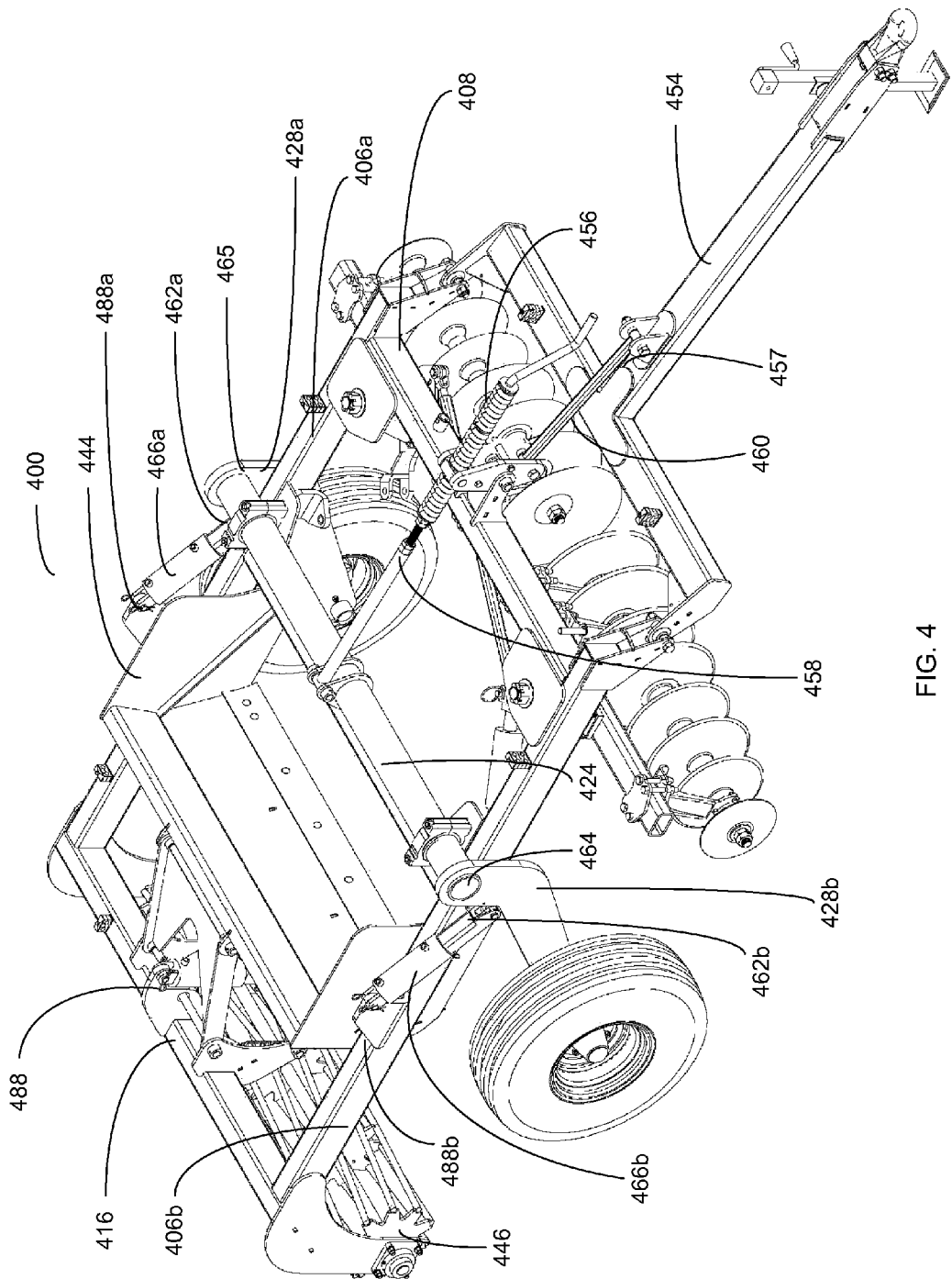
FIG. 4 is a side perspective view of an alternative preferred embodiment of a leveling and tillage implement of the present invention.

With reference now to FIG. 4, a further alternative preferred embodiment of a leveling and tillage implement 400 of the present invention will now be discussed. As shown in FIG. 4, implement 400 preferably includes a first actuator assembly 456 having a first actuating rod 458 attached between the front frame member 408 and the upper frame member 424. Further, a second actuator assembly 457 is provided which includes a second actuating rod 460 attached between the connecting element 454 and the front frame member 408. As further shown, a pair of hydraulic actuators 466a, 466b are preferably attached between the respective ends 464, 465 of the first and second elongated arm brackets 428a, 428b at respective attachment points 488a, 488b. The first actuator assembly 456 is operably connected along the front frame member 408 and the upper frame member 424 for pivotally raising and lowering the disc assemblies 134.

As further shown in FIG. 4, the pair of hydraulic actuators 466a, 466b preferably each includes a hydraulic cylinder 462a, 462b which are attached to respective side frame members 406a, 406b at respective attachment points 488a, 488b. Still further, implement 400 preferably includes a third actuator assembly 488 that is operably connected to the rear frame member 416 for hydraulically raising and lowering the box scraper 444 and the rolling attachment 446 with respect to the ground surface.

In another exemplary embodiment of the present invention, the implement may include a center frame section instead of crank shaft and third actuator assembly for transmitting motion to the disc assemblies, box scraper and rolling attachment. According to this alternative embodiment, the center frame section may include a hydraulic actuator for controlling the traction of the disc assemblies. Further, the rear frame member may include a hydraulic actuator for controlling the traction of the box scraper and the rolling attachment.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An implement for tilling and leveling a ground surface, the implement comprising:
    a main frame assembly, wherein the main frame assembly comprises:
        a main frame extending generally transverse to the direction of travel of the main frame assembly, the main frame comprising:
            a pair of opposing side frame members;
            a front frame member having a first end and a second end, the first and second ends including locking brackets;
            a pair of first and second lower frame members;
            a crank shaft coupled with the pair of first and second lower frame members utilizing a linking member through the locking brackets of the first and second ends of the front frame member respectively;
            a cross frame member having a first end and a second end, wherein each of the first and second ends includes a locking bracket; and
            a rear frame member; and
        an upper frame member being longitudinally disposed between the pair of opposing side frame members and attached on the locking brackets of the first and second ends of the cross frame member, the upper frame member including a first end and a second end, the first end and the second end of the upper frame member being attached to a first elongated arm bracket and a second elongated arm bracket respectively;
    a pair of opposing wheels, each wheel being positioned substantially centerline of the main frame along the direction of travel and pivotally mounted to one end of the first and second elongated arm brackets respectively;
    a pair of disc assemblies, wherein each disc assembly is positioned along the front frame member at the first and second lower frame members respectively and in front of the pair of opposing wheels, further wherein each disc assembly includes a plurality of disc gangs mounted along a shaft;
    a box scraper, wherein the box scraper is attached to the cross frame member;
    a rolling attachment connected at the rear frame member along the pair of opposing side frame members and behind the pair of opposing wheels;
    a first actuator assembly operably connected along the front frame member and the upper frame member for pivotally raising and lowering the pair of disc assemblies;
    a second actuator assembly operably coupled between the pair of first and second lower frame members for hydraulically controlling the pair of disc assemblies to provide an angular adjustment to the plurality of disc gangs;
    a third actuator assembly operably connected to the rear frame member for hydraulically raising and lowering the rolling attachment and the box scraper with respect to the ground surface; and
    a connecting element, wherein the connecting element is adapted to be removably attached to a vehicle.

2. An implement for tilling and leveling a ground surface, the implement comprising:
    a main frame, wherein the main frame comprises:
        a pair of opposing side frame members;
        a front frame member having a first end and a second end;
        a pair of first and second lower frame members;
        a crank shaft coupled with the pair of first and second lower frame members;
        a cross frame member having a first end and a second end; and
        a rear frame member; and an upper frame member being longitudinally disposed between the pair of opposing side frame members, wherein the upper frame member includes a first end and a second end, further wherein the first end and the second end are attached to a first elongated arm bracket and a second elongated arm bracket respectively;

a pair of opposing wheels, each wheel being positioned substantially centerline of the main frame along the direction of travel and pivotally mounted to one end of the first and second elongated arm brackets respectively;

a pair of disc assemblies, wherein each disc assembly includes a plurality of disc gangs mounted along a shaft;

a box scraper attached to the cross frame member;

a rolling attachment connected at the rear frame member along the pair of opposing side frame members and behind the pair of opposing wheels utilizing an arm member, wherein the rolling attachment is configured to level a surface;

a first actuator assembly operably connected along the front frame member and the upper frame member for pivotally raising and lowering the pair of disc assemblies;

a second actuator assembly operably coupled between the pair of first and second lower frame members for hydraulically controlling the pair of disc assemblies to provide an angular adjustment to the plurality of disc gangs;

a third actuator assembly operably connected to the rear frame member for hydraulically raising and lowering the rolling attachment and the box scraper with respect to the ground surface; and a connecting element, wherein the connecting element is adapted to be removably attached to a vehicle.

3. The implement of claim 2, wherein the plurality of disc gangs are arranged in a V-shaped configuration with its apex pointed in the direction of travel of the implement.

4. The implement of claim 3, wherein the pair of opposing wheels are adjustable to reduce the motion of the main frame perpendicular to the direction of travel.

5. The implement of claim 3, wherein the box scraper is attached with the cross frame member utilizing a support frame member and further wherein, the box scraper is also attached with the rear frame member utilizing an actuating mechanism.

6. The implement of claim 5, wherein each disc assembly is positioned along the front frame member at the first and second lower frame members respectively and in front of the pair of opposing wheels.

7. The implement of claim 6, wherein the first actuator assembly is configured to allow for the raising and lowering of the disc assemblies while the implement is in motion.

8. The implement of claim 7, wherein the second actuator assembly is configured to allow angle adjustments to be made to the disc gangs while the implement is in motion.

9. The implement of claim 8, wherein the first and second ends of the front frame member further comprises locking brackets.

10. The implement of claim 9, wherein the crank shaft is coupled with the pair of first and second lower frame members utilizing a linking member through the locking brackets of the first and second ends of the front frame member respectively.

11. The implement of claim 10, wherein the first end and a second end of the cross frame member further comprises a locking bracket.

* * * * *